United States Patent
Zhang et al.

(10) Patent No.: US 9,209,873 B1
(45) Date of Patent: Dec. 8, 2015

(54) METHOD AND APPARATUS FOR ESTIMATING NOISE AND PROVIDING LINEAR EQUALIZERS FOR MULTI-USER MIMO (MU-MIMO) WIRELESS COMMUNICATION SYSTEMS

(71) Applicant: Marvell International Ltd., Hamilton (BM)

(72) Inventors: Hongyuan Zhang, Fremont, CA (US); Yihong Qi, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 260 days.

(21) Appl. No.: 14/038,093

(22) Filed: Sep. 26, 2013

Related U.S. Application Data

(60) Provisional application No. 61/706,547, filed on Sep. 27, 2012.

(51) Int. Cl.
| | | |
|---|---|---|
| *H04B 3/46* | (2015.01) | |
| *H04B 17/00* | (2015.01) | |
| *H04B 7/04* | (2006.01) | |
| *H04B 17/345* | (2015.01) | |
| *H04L 25/03* | (2006.01) | |

(52) U.S. Cl.
CPC ............ *H04B 7/0452* (2013.01); *H04B 17/345* (2015.01); *H04L 25/03159* (2013.01); *H04L 25/03891* (2013.01)

(58) Field of Classification Search
CPC .. H04B 7/0452; H04B 7/0413; H04B 17/309; H04B 17/336; H04B 17/345; H04B 15/00; H04L 25/0204; H04L 25/03159; H04L 25/03891; G01R 29/26
USPC .......................................... 375/227, 229–232
See application file for complete search history.

(56) References Cited

U.S. PATENT DOCUMENTS

| | | | |
|---|---|---|---|
| 8,989,294 B2 * | 3/2015 | Sun et al. .................... 375/267 |
| 2006/0072524 A1 * | 4/2006 | Perahia et al. ............... 370/338 |
| 2006/0211377 A1 * | 9/2006 | Shoemake et al. ......... 455/67.13 |
| 2007/0242768 A1 * | 10/2007 | Wallace et al. .............. 375/260 |
| 2008/0075158 A1 * | 3/2008 | Li .................................. 375/232 |
| 2008/0225998 A1 * | 9/2008 | Fu .................................. 375/346 |
| 2009/0046772 A1 * | 2/2009 | Yu et al. ........................ 375/229 |
| 2010/0197262 A1 * | 8/2010 | Hosokawa et al. ......... 455/234.1 |

\* cited by examiner

*Primary Examiner* — David B. Lugo

(57) ABSTRACT

Some of the embodiments provide a method comprising during a first time period, receiving, by a first user equipment, (i) a first signal intended for the first user equipment, (ii) a second signal intended for a second user equipment, and (iii) a noise signal having a first noise power level; during a second time period, receiving, by the first user equipment, the noise signal having the first noise power level; during the first time period and the second time period, propagating the noise signal through a plurality of components of the first user equipment such that the noise signal is scaled by the plurality of components, wherein subsequent to the scaling of the noise signal, the noise signal has a second noise power level; and estimating the second noise power level.

20 Claims, 4 Drawing Sheets

US 9,209,873 B1

METHOD AND APPARATUS FOR ESTIMATING NOISE AND PROVIDING LINEAR EQUALIZERS FOR MULTI-USER MIMO (MU-MIMO) WIRELESS COMMUNICATION SYSTEMS

CROSS REFERENCE TO RELATED APPLICATIONS

This claims priority to U.S. Provisional Patent Application No. 61/706,547, filed Sep. 27, 2012, which is incorporated herein by reference.

TECHNICAL FIELD

Embodiments of the present disclosure relate to multi-user MIMO (MU-MIMO) wireless communication systems, and more particularly, to estimating noise and providing linear equalizers for MU-MIMO systems.

BACKGROUND

In wireless communication systems, multiple-input and multiple-output (MIMO) refers to use of multiple antennas at both a transmitter and a receiver to improve communication performance. Multi-user MIMO (MU-MIMO) refers to a MIMO system in which a base station or an access point transmits data streams simultaneously to a plurality of user equipments. To enhance the communication capabilities of all the terminals, MU-MIMO applies an extended version of space-division multiple access (SDMA) to allow multiple transmitters to send separate signals and multiple receivers to receive separate signals simultaneously in the same band.

SUMMARY

In various embodiments, the present disclosure describes a method comprising during a first time period, receiving, by a first user equipment, (i) a first signal intended for the first user equipment, (ii) a second signal intended for a second user equipment that is different from the first user equipment, and (iii) a noise signal having a first noise power level, wherein the first signal and the second signal are received from an access point; during the first time period, processing, by an automatic gain control module of the first user equipment using a first gain factor, (i) the first signal, (ii) the second signal, and (iii) the noise signal; during a second time period, receiving, by the first user equipment, the noise signal having the first noise power level, wherein during the second time period, no signals are received by the first user equipment from the access point; during the second time period, processing, by the automatic gain control module of the first user equipment using a second gain factor, the noise signal; determining a ratio of the second gain factor and the first gain factor; during the first time period and the second time period, propagating the noise signal through a plurality of components of the first user equipment such that the noise signal is scaled by the plurality of components, wherein subsequent to the scaling of the noise signal, the noise signal has a second noise power level; and based on the ratio of the second gain factor and the first gain factor, estimating the second noise power level.

In various embodiments, the present disclosure also describes a user equipment comprising (A) an antenna configured to during a first time period, receive (i) a first signal intended for the user equipment, (ii) an interference signal, and (iii) a noise signal having a first noise power level, wherein the first signal and the second signal are received from an access point, and during a second time period, receive the noise signal having the first noise power level, wherein during the second time period, no signals are received from the access point; (B) an automatic gain control module configured to during the first time period, process, using a first gain factor, (i) the first signal, (ii) the second signal, and (iii) the noise signal, and during the second time period, process, using a second gain factor, the noise signal; (C) a plurality of components that comprises at least the automatic gain control module and one or more other components, wherein during the first time period and the second time period, the noise signal is propagated through the plurality of components such that the noise signal is scaled by the plurality of components, wherein subsequent to the scaling of the noise signal, the noise signal has a second noise power level; and (D) a noise estimation module configured to determine a ratio of the second gain factor and the first gain factor, and based on the ratio of the second gain factor and the first gain factor, estimate the second noise power level.

BRIEF DESCRIPTION OF THE DRAWINGS

In the following detailed description, reference is made to the accompanying drawings which form a part hereof wherein like numerals designate like parts throughout, and in which is shown by way of embodiments that illustrate principles of the present disclosure.

DETAILED DESCRIPTION

Figure 1:
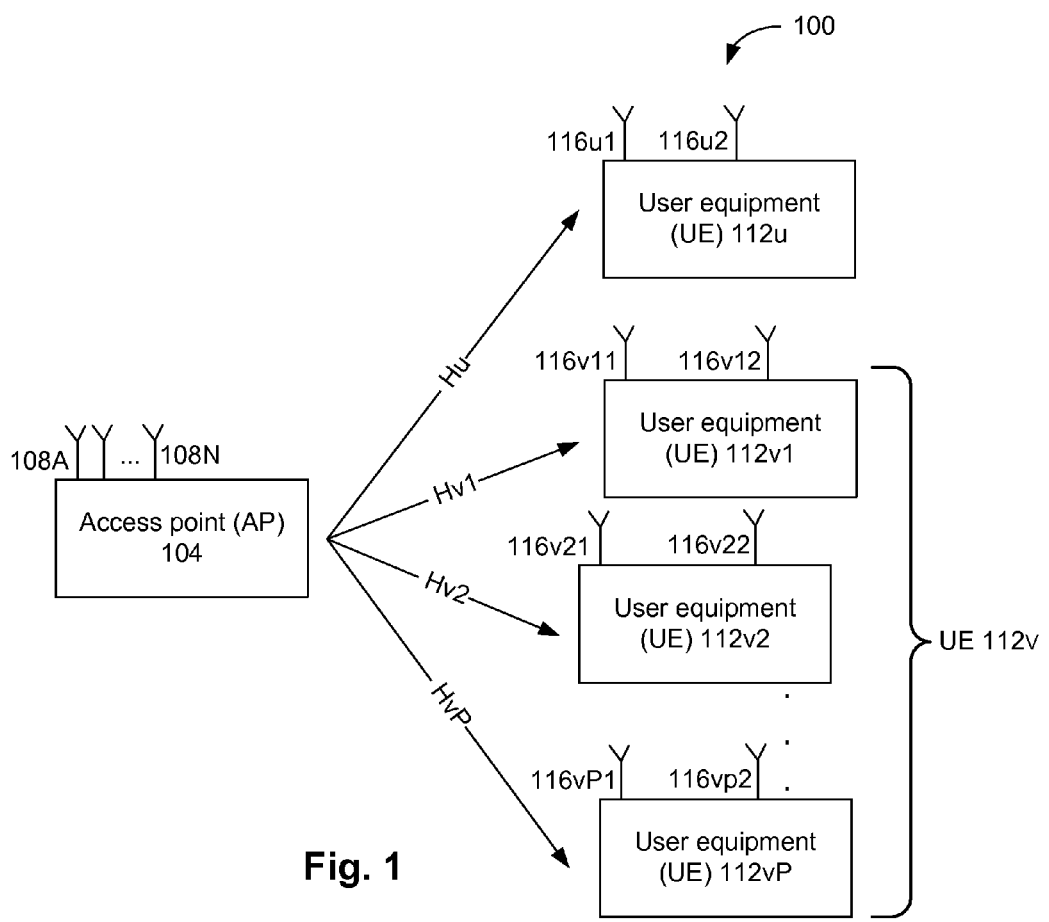
FIG. 1 schematically illustrates an example multiple-user multiple-input/multiple-output (MU-MIMO) wireless communication system comprising an access point (AP) and a plurality of user equipments.

FIG. 1 schematically illustrates an example multiple-user multiple-input/multiple-output (MU-MIMO) wireless communication system 100 (henceforth referred to herein as "system 100") comprising an access point (AP) 104 and a plurality of user equipments (UEs) $112u, 112v1, 112v2, \ldots, 112v\text{P}$, where P is an appropriate integer. The UEs $112u$, $112v1, \ldots, 112v\text{P}$ represent, for example, mobile devices that communicate data by way of radio transmissions with at least the AP 104.

For ease for notation and unless otherwise stated, the UEs $112v1, \ldots, 112v\text{P}$ are collectively indicated by UE $112v$ (i.e., a reference to UEs $112v$ indicates one or more of the UEs $112v1, \ldots, 112v\text{P}$). Furthermore, unless otherwise stated, a notation with a suffix "v" signifies that the notation is associated with one or more (e.g., all) of the UEs $112v1, \ldots, 112v\text{P}$. Although UE $112u$ has a different notation than the notations of the UE $112v1, \ldots, 112v\text{P}$, such a difference is merely for ease of explanation. Although FIG. 1 illustrates a specific (e.g., (P+1)) number of UEs, the system 100 may include any different number of UEs.

In an example, the system 100 operates in accordance with Institute of Electrical and Electronics Engineers (IEEE) 802.11ac standard for providing high-throughput wireless local area networks (WLAN5), scheduled for release on 2014 (or other appropriate versions). In another example, the system 100 operates in accordance with "Long Term Evolution" (LTE) standard, e.g., release 9 specification (or other appropriate releases). In the embodiment where the system 100 operates in accordance with the LTE standard, the AP 104 represents a base station (e.g., a cellular telephone transmitter/receiver tower). In yet another example, the system 100 operates in accordance with any appropriate MU-MIMO wireless communication standards.

The AP 104 has a plurality of antennas 108A, ..., 108N, each configured to transmit and/or receive signals (e.g., data streams) to and/or from the UEs 112u, 112v1, ..., 112vP, where N is an appropriate integer. Each of the UEs 112u, 112v1, ..., 112vP has one or more antennas configured to transmit and/or receive signal to and/or from the AP 104. For example, UE 112u has antennas 116u1 and 116u2; UE 112v1 has antennas 116v11 and 116v12; UE 112vP has antennas 116vP1 and 116vP2, and so on. Although FIG. 1 illustrates each UE comprising two antennas, individual UEs can have any different number of antennas.

A channel between the AP 104 and the UE 112u is represented by a channel matrix $H_u$; a channel between the AP 104 and the UE 112v1 is represented by a channel matrix $H_{v1}$; a channel between the AP 104 and the UE 112vP is represented by a channel matrix $H_{vP}$, and so on. In an embodiment, each UE is configured to estimate a channel matrix that represents the channel between the corresponding UE and the AP 104.

Figure 2:
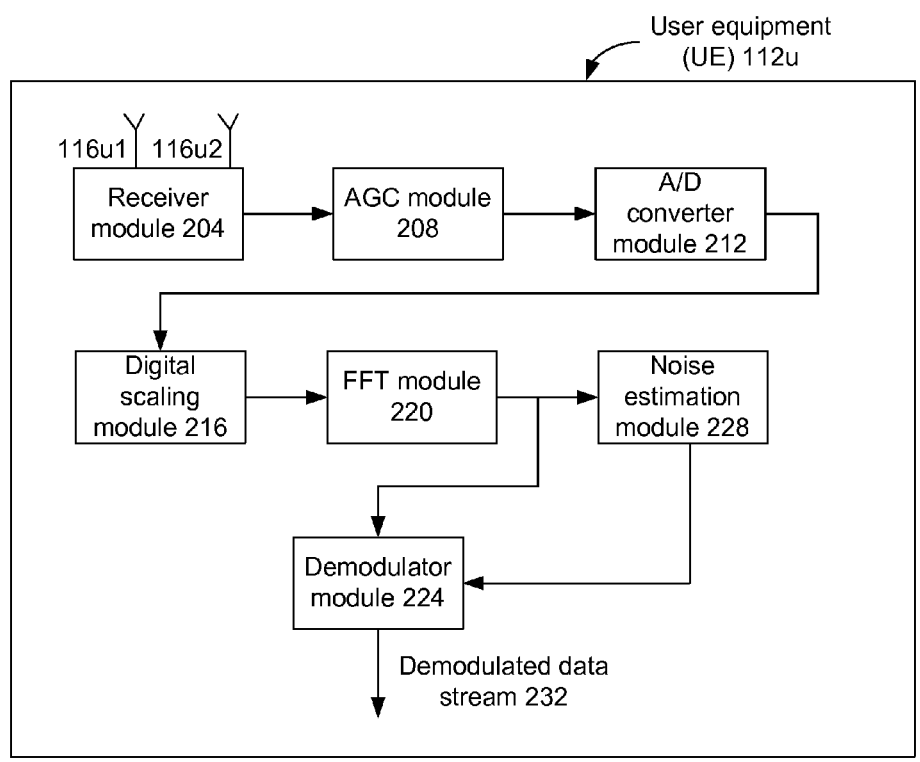
FIG. 2 schematically illustrates an example implementation of a user equipment of FIG. 1 in more detail.

FIG. 2 schematically illustrates an example implementation of the UE 112u of FIG. 1 in more detail. The UE 112a has one or more antennas 116u1 and 116u2 configured to at least receive signals transmitted by the AP 104. A receiver module 204 of the UE 112u is configured to receive an output of the antennas, and transmit the received signal to an automatic gain control (AGC) module 208. The AGC module 208 automatically controls a gain of the received signal, and outputs a gain adjusted signal to an analog to digital (A/D) converter module 212. The output of the AGC module 208 is in analog form, which is converted in a digital form by the A/D converter module 212. In an embodiment, the digital output of the A/D converter module 212 is appropriately scaled by a digital scaling module 216. A scaled output of the digital scaling module 216 is received by a fast Fourier transform (FFT) module 220. The FFT module 220 performs an FFT operation, e.g., converts the received signal from a time domain to a frequency domain. The FFT module 220 outputs to a demodulator module 224, which demodulates the received signal to generate a demodulated data stream 232.

While data streams are being transmitted from the AP 104 to the UE 112u, and while the data streams are being processed by various components of the UE 112u, noise is injected in the data streams. For example, additive noise, thermal noise, quantization noise, and/or the like are added to the data streams while being transmitted to the UE 112u, in various stages of the AGC module 208, the A/D converter module 212, the digital scaling module 216, and/or the like. In an embodiment, the UE 112 comprises a noise estimation module 228 configured to estimate noise in the data streams received by the demodulator module 224. The demodulator module 224 receives the noise estimate from the noise estimation module 228, and uses the noise estimation to demodulate the data streams.

In an embodiment, in the MU-MIMO system 100, the AP 104 transmits data streams for different UEs simultaneously and in the same frequency band. However, the data streams being transmitted to the UEs 112v (i.e., one or more of the UEs 112v1, ..., 112vP) may interfere with the data stream being transmitted to UE 112u. To reduce such interference, the data streams, prior to being transmitted by the AP 104, are pre-coded by the AP 104 by a MU pre-coding matrix $Q_{MU}$. Pre-coding matrix $Q_{MU}$ can be represented by $Q_{MU} = [Q_u, Q_{v1}, \ldots, Q_{vP}]$, where $Q_u, Q_{v1}, \ldots, Q_{vP}$ are pre-coding matrices used for pre-coding data streams intended for UEs 112u, 112v1, ..., 112vP, respectively.

Let the signal transmitted by the AP 104 for the UE 112u be represented as $x_u$; the signal transmitted by the AP 104 for the UE 112v1 be represented as $x_{v1}$; the signal transmitted by the AP 104 for the UE 112v2 be represented as $x_{v2}$; and so on. Let signal $y_u$ represent the signal received by the UE 112u. Signal $y_u$ received by the UE 112u is given by the following equation:

$$y_u = H_u Q_u x_u + H_u \sum_{v \neq u} Q_v x_v + n = A_u x_u + \sum_{v \neq u} A_v x_v + n \quad \text{Equation 1}$$

where the pre-coding matrix $Q_v$ represents each of the pre-coding matrices $Q_{v1}, \ldots, Q_{vP}$ (i.e., in equation 1, v varies from 1 to P); signal $x_v$ represents each of the signals $x_{v1}, \ldots, x_{vP}$; the signal n represents noise added to the signal $x_u$ while being transmitted from the AP104 to the UE 112u; the term $A_u$ represents $H_u \cdot Q_u$; and the term $A_v$ represents $H_u \cdot Q_v$.

Ideally, the MU pre-coding matrix $Q_{MU}$ is to be designed such that $H_u \cdot Q_v = 0$ for v=1, ..., P, so that interference signal to the UE 112u is perfectly cancelled. However, in practice, it may not always be possible to perfectly cancel the interference. So, a signal receiver at the UE 112u aims to mitigate an effect of the interference to the extent possible, in order to increase the performance of the receiver at the UE 112.

In an embodiment, the demodulator module 224a at the UE 112u generates a signal $z_u$ from the received signal $y_u$ using the following:

$$z_u = W_u \cdot y_u \quad \text{Equation 2}$$

where $y_u$ is the signal generated from equation 1, and $W_u$ is a matrix used for decoupling various data streams in the signal $y_u$ (e.g., the matrix $W_u$, to an extent possible, cancels the component of signal $y_u$ that are associated with $x_v$ and n in equation 1). In an embodiment, the signal $z_u$ is generated and used by the demodulator module 224a in the UE 112u to generate the data stream $x_u$ transmitted by the AP 104 to the UE 112u.

Figure 3:
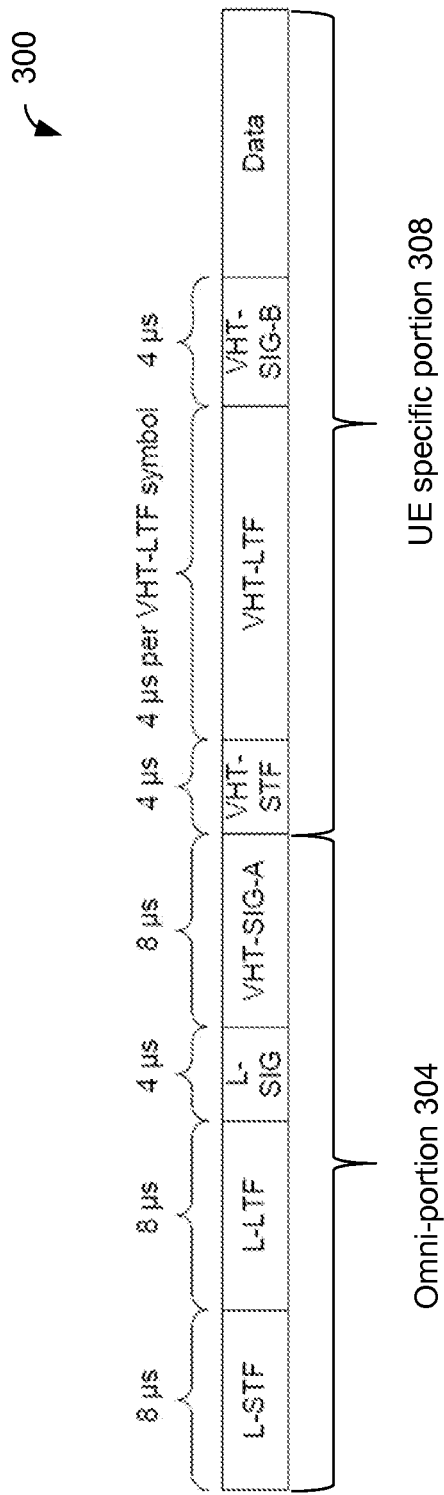
FIG. 3 illustrates a format of an example data packet transmitted by an access point to a user equipment.

FIG. 3 illustrates a format of an example data packet 300 (henceforth referred to as "packet 300") transmitted by the AP 104 to one of the UEs. The packet 300 is transmitted, for example, by the AP 104 to the UE 112u (i.e., the packet 300 is included in the signal $x_u$).

The packet 300 comprises an omni-portion 304 and a UE specific portion 308. The omni-portion 304 is common for packets transmitted to each of the UEs 112u, 112v1, ..., 112vP (i.e., packets transmitted to each of the UEs 112u, 112v1, ..., 112vP will have the omni-portion 304). The UE specific portion 308 of the packet 300 is specifically for the UE 112u. The packet 300 is in accordance with a format of a packet within the 802.11ac standards for MU-MIMO packets.

As illustrated in FIG. 3, the packet 300 comprises long training fields (LTFs), which are used for training a UE for accurately receiving and decoding the data streams from the AP 104. Referring again to equation 1, the UE 112u receives the signal $x_u$ intended for the UE 112u, and also receives part of the signals $x_{v1}, x_{v2}, \ldots, x_{vP}$ intended for other UEs. Each of these signals has corresponding packets having corresponding LTFs. Accordingly, the UE 112u receives a plurality of LTFs destined for the plurality of UEs 112u, 112v1, ..., 112vP.

Assume that $Y_{LTFu}$ is the LTF included in a packet that is intended for the UE 112u, $Y_{LTFv1}$ is the LTF included in a packet that is intended for the UE 112v1, $Y_{LTFvP}$ is the LTF included in a packet that is intended for the UE 112vP, and so on. Also, all the LTFs intended for all the UEs, when received by the UE 112u, has to transmit through the channel between the AP 104 and the UE 112u. Accordingly, $$[y_{LTFu} y_{LTFv1} \ldots y_{LTFvP}]_{user\_u} = H_u \cdot [Q_u Q_{v1} \ldots Q_{vP}] \cdot D_{CSD} \cdot P \quad \text{Equation 3}$$

where $[y_{LTFu} y_{LTFv1} \ldots y_{LTFvP}]_{user\_u}$ represents the LTFs intended for various UEs, as received by the UE 112u; $D_{CSD}$ is a diagonal matrix with a phase shift; and P is a pre-defined matrix (e.g., as defined in a wireless communication standard associated with the system 100). It is to be noted that $H_u \cdot Q_u \cdot D_{CSD} = A_u$, and $H_u \cdot [Q_{v1} \ldots Q_{vP}] \cdot D_{CSD} = A_v$, where $A_u$ and $A_v$ are discussed with respect to equation 1. The term $A_u$ is associated with the signal transmitted from the AP 104 to the UE 112u, and the term $A_v$ is associated with interference from the AP 104 to the UE 112u (e.g., due to the AP 104 simultaneously transmitting to the other UEs, i.e., UEs 112v). Based on the received LTFs $[y_{LTFu} y_{LTFv1} \ldots y_{LTFvP}]_{user\_u}$, the UE 112u estimates $A_u$ and $A_v$ from equation 3. As the matrix $D_{CSD}$ is known to the UE 112u, the UE 112u is has an estimate of each of $H_u \cdot Q_u$ and $H_u \cdot [Q_{v1} \ldots Q_{vP}]$. As discussed herein later, such estimation is used by the UE 112u to estimate the $W_u$ matrix of equation 2, such that the signal $z_u$ provides a relatively accurate estimate of the signal $x_u$.

Linear Multi-User Equalizer (MEQ) Algorithms

As discussed with respect to equation 2, if the matrix $W_u$ is estimated, the signal $z_u$ can be derived from the signal $y_u$ such that the signal $z_u$ is a relatively accurate estimate of the signal $x_u$ transmitted by the AP 104 for the UE 112u. Based on the estimate of $A_u$ and/or the estimate of $A_v$ (e.g., as discussed above with respect to equation 3), the UE 112u determines the matrix $W_u$ and a signal to interference and noise ratio ($SINR_i$) for an $i^{th}$ data stream from the AP 104 to the UE 112u. Various examples of multi-user equalizer (MEQ) algorithms for estimating $W_u$ and $SINR_i$ are discussed below. In some of the example MEQ algorithms discussed below, the determination of matrix $W_u$ and the SINR also requires an estimation of noise $N_0$, which represents a power of additive noise added to the signal prior to processing of the signal by the AGC module 208 (e.g., noise added to the data streams while the data streams are being transmitted by the AP 104 to the UE 112u). Estimation of the noise $N_0$ is also discussed herein later.

Linear Multi-User Equalizer (MEQ)
Algorithm—Minimum Mean Square Error (MMSE)
Algorithm In a minimum mean square error (MMSE) algorithm, the UE 112u utilizes the estimates of $A_u$, $A_v$ and noise $N_0$ to determine the matrix $W_u$ and the $SINR_i$. In accordance with the MMSE algorithm, $$W_u = A_u^H \cdot \left[ A_u A_u^H + \sum_{v \neq u} A_v A_v^H + N_0 I \right]^{-1} \quad \text{Equation 4}$$

$$SINR_i = \frac{\|(W_u A_u)_{ii}\|^2}{([W_u A_u A_u^H W_u^H]_{ii} - \|(W_u A_u)_{ii}\|^2) + \sum_{v \neq u} [W_u A_v A_v^H W_u^H]_{ii} + N_0 [W_u W_u^H]_{ii}} \quad \text{Equation 5}$$

Thus, the estimation of $W_u$ and $SINR_i$, in accordance with the MMSE algorithm, requires estimation of noise $N_0$ (e.g., which is discussed herein later), along with estimates of $A_u$ and $A_v$. In an embodiment, the MMSE represents an optimal linear MU-MEQ algorithm.

Linear Multi-User Equalizer (MEQ)
Algorithm—Single User Zero Forcing (SUZF)
Algorithm A single user zero forcing (SUZF) algorithm ignores interference (e.g., ignores the term $A_v$) and the noise $N_0$ while estimating the matrix $W_u$ and $SINR_i$. In accordance with the SUZF algorithm, $$W_u = [A_u^H A_u]^{-1} A_u^H. \quad \text{Equation 6}$$

$$SINR_i = \frac{1}{(A_u^H A_u)_{ii}^{-1}} \quad \text{Equation 7}$$

The SUZF algorithm assumes the MU-MIMO system as a single user MIMO system (i.e., ignores interference from data streams intended for other UEs), and estimates $W_u$ and $SINR_i$ based on such assumptions. As the SUZF algorithm ignores the interference and noise $N_0$, the SUZF algorithm is relatively less accurate (but relatively easy to implement) compared to the MMSE algorithm discussed with respect to equations 4 and 5. Also, as the SUZF algorithm does not require an estimation of noise $N_0$, there is no need to estimate the noise $N_0$ to implement the SUZF algorithm.

Linear Multi-User Equalizer (MEQ)
Algorithm—SUZF and SINR Algorithm

A SUZF and SINR algorithm ignores interference (e.g., ignores the term $A_v$) and the noise $N_0$ while estimating the matrix $W_u$, but considers the interference and noise $N_0$ while estimating the $SINR_i$. In accordance with the SUZF and SINR algorithm, $$W_u = [A_u^H A_u]^{-1} A_u^H. \quad \text{Equation 8}$$

$$SINR_i = \frac{1}{\sum_{v \neq u} [W_u A_v A_v^H W_u^H]_{ii} + N_0 [W_u W_u^H]_{ii}} \quad \text{Equation 9}$$

As the SUZF and SINR algorithm takes into account interference and noise $N_0$ while determining the $SINR_i$, the SUZF and SINR algorithm is relatively more accurate than the SUZF algorithm.

In an embodiment, if each of the UEs has only a single antenna (e.g., although not illustrated in FIG. 1), then the SUZF and SINR algorithm can be simplified such that the SUZF and SINR algorithm becomes identical to the previously discussed MMSE algorithm. For example, equation 8 can, in such a case, be simplified such that $W_u = A_u$, where the "*" sign indicates a complex value of $A_u$. Also, equation 9 can be simplified as:

$$SINR_1 = \frac{\|A_1\|^2}{\|A_2\|^2 + N_0} \qquad \text{Equation 9A}$$

where $A_1$ is equal to $A_u$, and $A_2$ is equal to $A_v$.

Linear Multi-User Equalizer (MEQ) Algorithm—SUZF AND SIR Algorithm

A SUZF and signal to interference ratio (SIR) algorithm ignores interference (e.g., ignores the term $A_v$) and the noise $N_0$ while estimating the matrix $W_u$, but considers the interference while estimating the $SINR_i$ (but ignores the noise $N_0$ while estimating the $SINR_i$). In accordance with the SUZF and SIR algorithm, $$W_u = [A_u^H A_u]^{-1} A_u^H. \qquad \text{Equation 10}$$

$$SINR_i = \frac{1}{\sum_{v \neq u}[W_u A_v A_v^H W_u^H]_{ii}} \qquad \text{Equation 11}$$

As the SUZF and SIR algorithm takes into account interference while determining the $SINR_i$, the SUZF and SIR algorithm is relatively more accurate than the SUZF algorithm. Also, as the SUZF and SIR algorithm does not require an estimation of noise $N_0$, there is no need to estimate the noise $N_0$ to implement the SUZF and SIR algorithm.

In an embodiment, if each of the UEs has only a single antenna (e.g., although not illustrated in FIG. 1), then equation 10 of the SIR algorithm can be simplified as $W_u = A_u^*$, and equation 11 can be simplified as:

$$SINR_1 = \frac{\|A_1\|^2}{\|A_2\|^2} \qquad \text{Equation 11A}$$

Linear Multi-User Equalizer (MEQ) Algorithm—MUZF Algorithm

A multi-user zero forcing (MUZF) algorithm is implemented if, for example, a number of receive antennas in the UE 112*u* is greater than or equal to a total number of data streams simultaneously transmitted by the AP 104 (e.g., where one or more of the total number of data streams is intended for the UE 112*u*). For example, assume that the UE 112*u* has $N_{RX}$ number of receive antennas (e.g., in FIG. 1, $N_{RX}=2$), and the total number of data streams simultaneously transmitted by the AP 104 is $N_{STS\_total}$. For example, if the AP 104 simultaneously transmits a single data stream for each of the UEs 112*u*, 112*v*1, 112*v*P, then $N_{STS\_total}=(P+1)$. In an embodiment, the MUZF algorithm is used if $N_{RX} \geq N_{STS\_total}$.

Assume a matrix $A=[A_u\ A_{v1}\ \ldots\ A_{vP}]$. In accordance with the MUZF algorithm, $$A = [A_1 A_2 \ldots A_U]$$

$$W_u = [A^H A]^{-1} A^H \qquad \text{Equation 12}$$

$$SINR_i = \frac{1}{(A^H A)_{ii}^{-1}} \qquad \text{Equation 13}$$

Thus, in MUZF, the UE 112*u* performs a zero forcing on all the data streams, and separates the data streams (i.e., separates the data stream intended for the UE 112 from the other data streams intended for the other UEs).

Noise Power Estimation

As previously discussed, an estimation of noise power is required at least for the (i) MMSE algorithm and (ii) the SUZF and SINR algorithm. Noise in the signal received by the demodulator module 224 of the UE 112*u* can be from various sources. For example, noise may be added to the signal while being transmitted from the AP 104 to the UE 112*u*. Noise may also be added in one or more gain stages of the AGC module 208, during a quantization operation performed by the A/D converter 212, digital scaling performed by the digital scaling module 216, thermal noise, and/or the like. Furthermore, as the signal received by the UE 112*u* is scaled by the digital scaling module 216, the noise estimated by the noise estimation module 228 has to be scaled accordingly (e.g., as the noise in the signal is also scaled by the digital scaling module 216).

In an embodiment, a noise power in a data stream, as seen by the demodulator module 224, is given by:

$$N_{BB} = \sum_{g=1}^{N_{Gains}} \left\{ \left( \prod_{i=1}^{N_{Gains}-i+1} G_i \right) \cdot N_g \right\} \qquad \text{Equation 14}$$

where $N_g$ is a noise power in a given stage of the data processing path in the UE 112*u*; $G_i$ represents a gain step (e.g., in which a noise is amplified by gain $G_i$); $N_{Gains}$ represent a total number of stages in the data processing path in the UE 112*u*; and $N_{BB}$ is a frequency domain noise power observed in the demodulator module 224 of the UE 112*u*. So, $N_{BB}$ is the noise observed by the demodulator module 224, which is scaled by all the gains of the data processing path in the UE 112*u* (e.g., where the data processing path in the UE 112*u* comprises the circuit path between the antennas of the UE 112*u* and the demodulator module 224. Noise power estimation (e.g., estimation of the noise $N_{BB}$) using two different approaches are discussed below.

Noise Power Estimation Based on AGC Gain Change

Let $P_s$ represent an input signal power received at the antennas of the UE 112*u* (i.e., $P_s$ represents a power of the signal $x_u$, after being precoded by the corresponding precoding matrix and after traversing the channel between the AP 104 and the UE 112*u*), $P_I$ represent an interference signal power received at the antennas of the UE 112*u* (i.e., $P_I$ represents a power of the signals $x_{v1}, \ldots, x_{vP}$, after being precoded by the corresponding precoding matrices and after traversing the channel between the AP 104 and the UE 112*u*), and $N_0$ represent a noise power received at the antennas of the UE 112*u*. Thus, $N_0$ is the power of the noise in the signals received by the antennas of the UE 112*u*, prior to the signals being processed by the AGC module 208.

A noise period (also referred to herein as "idle period") refers to a period when no signal is being received by the UE 112*b* (e.g., when no data streams are being transmitted by the AP 104). During the idle period, only noise is being received by the UE 112*u*. Let the gain factor of the AGC module 208 during the idle period be NF, which is a noise floor of the UE

112u. Let RSSI represent the gain factor of the AGC module 208 after receiving the VHT-STF portion of a packet (e.g., as illustrated in FIG. 3), i.e., when actual data or the UE specific portion 308 of the packet is being transmitted by the AP104. That is, RSSI is the gain factor of the AGC module 208 while the UE 112u receives actual data from the AP 104. Furthermore, let a gain target of the AGC module 208 at the output of the A/D converter module 212 be GT.

In an embodiment, signal power during the VHT-STF, as measured at the baseband frequency for each receive antenna, is given by:

$$\|y_u\|^2 = \beta \qquad \text{Equation 15}$$

For example, $\beta$ is the signal power at the demodulator module 224. In an embodiment, GT (which represents the signal power in time domain, at the output of the A/D converter module 212) may not be same as $\beta$, due to presence of the digital scaling module 216 (i.e., due to digital scaling of the signal) subsequent to the A/D converter module 212.

The noise power $N_0$, noise floor NF and the gain target GT are related as follows:

$$N_0 \cdot NF = GT \qquad \text{Equation 16}$$

Equation 16 is applicable during the idle period, i.e., when no signal is being received by the UE 112b (e.g., no data stream transmitted by the AP 104). During the idle period, the noise power $N_0$ is amplified by the noise floor NF, such that the output of the A/D converter module 212 is GT.

When the UE 112u receives signals from the AP 104 (e.g., receives signals intended for the UE 112u, as well as interference signals intended for other UEs, i.e., subsequent to receiving the VHT-STF of the data packets), the AGC gain RSSI is related to the GT as follows:

$$(P_s + P_I + N_0) \cdot RSSI = GT \qquad \text{Equation 17A}$$

where $P_s$ represents the input signal power received at the antennas of the UE 112u, and $P_I$ represent the interference signal power received at the antennas of the UE 112u. In equation 17A, the total signal power received by the antennas of the UE 112u is $(P_s + P_I + N_0)$ (e.g., while actual data streams are received by the UE 112u), which is multiplied by RSSI (representing AGC gain factor while actual data streams are received by the UE 112u) to achieve GT. Thus, the AGC module 208 selectively varies the AGC gain, such that the output of the A/D converter module 212 is substantially GT at all times (i.e., is substantially GT during the idle period, and also while actual data streams are received by the UE 112u).

In equation 17A, the noise power $N_0$ is substantially smaller than the terms $P_s$ and $P_I$ (i.e., noise power $N_0$ is smaller in comparison to the signal and interference power), and hence the noise power $N_0$ can be ignored, leading to a simplification of equation 17A as follows:

$$(P_s + P_I) \cdot RSSI = GT \qquad \text{Equation 17B}$$

A ratio $\alpha$ is defined as:

$$\alpha = \frac{NF}{RSSI} = \frac{P_S + P_I}{N_0} \qquad \text{Equation 18}$$

Equation 18 is derived from equations 16 and 17B. The ratio $\alpha$ (also referred to herein as "gain change ratio") is a ratio of the AGC gain during the idle period and the AGC gain when actual data stream is being received by the UE 112u. The ratio $\alpha$ is representative of a change of the AGC gain from the idle period to the period when actual data stream is being received by the UE 112u.

Also, the signal power (e.g., while actual data stream is being received by the UE 112u), as measured in the frequency domain in the input of the demodulator module 224, is given by:

$$\beta = \|y\|^2 = (P_s + P_I) \cdot RSSI \cdot c \qquad \text{Equation 19}$$

where c is a digital scaling factor of the digital scaling module 216. It is to be noted that similar to equation 17B, the noise power $N_0$ is ignored in equation 19.

Equations 18 and 19 is combined to achieve the following:

$$N_0 \cdot RSSI \cdot c = \frac{\beta}{\alpha} \qquad \text{Equation 20}$$

As discussed previously, $N_0$ represent the noise power received at the antennas of the UE 112u, prior to the signal being processed by the AGC module 208 (i.e., $N_0$ represents pre-AGC noise power). The term $N_0 \cdot RSSI \cdot c$ represents an effect of the noise power $N_0$, as seen in the frequency domain by the demodulator module 224.

Thus, the term $N_0 \cdot RSSI \cdot c$ of equation 20 represents an effect of the noise power $N_0$ in the baseband noise $N_{BB}$ observed in the digital baseband by the demodulator module 224. However, the baseband noise $N_{BB}$ also has components of noise added in the AGC module 208 and/or subsequent to the AGC module 208 (collectively referred to herein as "post-AGC noise"). The effect of the post-AGC noise is represented by a factor r in the following equation:

$$N_{BB} = \frac{\beta}{\alpha}(1 + r) \qquad \text{Equation 21}$$

In equation 21, the term $\beta/\alpha$ is from equation 19 representing an effect of noise $N_0$ in the baseband noise $N_{BB}$, and the term $(\beta/\alpha) \cdot r$ represents the effect of post-AGC noise in the baseband noise $N_{BB}$.

The factor r, representing a contribution of the post-AGC noise in the baseband noise $N_{BB}$, is a tunable factor. In an embodiment, the factor r is tuned using a register in the demodulator module 224. For example, in an experimental setting using an UE, the factor r is varied and a performance of the UE is measured. A value of r, which provides an optimal or near optimal performance of the UE, is selected and used in the UE 112u.

In another embodiment, the factor r is derived from a look-up table (LUT), based, for example, on a value of RSSI. Each candidate value of RSSI has a corresponding candidate value of r in the LUT. The LUT is generated for various values of RSSIs using, for example, the above discussed experimental setting of the UE. Based on the actual value of the RSSI used by the UE 112u, an appropriate value of r is selected from the LUT.

In an embodiment, one or more of the operations discussed above for estimating the baseband noise $N_{BB}$ are performed, for example, by the noise estimation module 228 of the UE 112u.

In an embodiment, if the UE 112u has more than one receive antennas (e.g., antennas 116u1 and 116u2, as illustrated in FIG. 2), the baseband noise $N_{BB}$ can be computed on one of the receive antennas (e.g., and applied to data streams received by other receive antennas). In another embodiment, if the UE 112u has more than one receive antennas (e.g., antennas 116u1 and 116u2, as illustrated in FIG. 2), the baseband noise $N_{BB}$ can be computed on all the receive antennas, and then averaged to find the baseband noise $N_{BB}$ for individual receive antennas.

In an embodiment, the estimated baseband noise $N_{BB}$ (e.g., as estimated using equation 21) is used, for example, in one or more of the previously discussed linear multi-user equalizer (MEQ) algorithms (e.g., the MMSE algorithm, and the SUZF and SINR algorithm). For example, in these algorithms, the estimated baseband noise $N_{BB}$ is used (e.g., instead of the noise power $N_0$); along with using, instead of terms $A_u$ and $A_v$, a scaled version of the terms $A_u$ and $A_v$, to account for the AGC gain and scaling of the signal and interference signals by various components of the UE 112$u$.

Noise Power Estimation Based on SIGA Field

As illustrated in FIG. 3, the omni-portion 304 of the packet 300 has a SIGA filed. While SIGA is being received by the UE 112$u$, no data is being transmitted by the AP 104 to the UEs (data to individual UEs are being transmitted during the UE specific portion 308, while the omni-portion 304 is transmitted commonly to all the UEs simultaneously by the AP 104). Accordingly, no interference is present while the SIGA filed is being received by the UE 112$u$. Noise power estimation based on SIGA field is usually preferred (e.g., preferred over noise power estimation based on AGC gain change, as discussed with respect to at least equation 21) in a moderate to high SNR range, and/or when the SIG-A field is modulated using binary phase-shift keying (BPSK).

Let the signal received per tone and per receive antenna (e.g., antenna 116$u$1) of the UE 112$u$ be given by:

$$Y = HS + Z \quad \text{Equation 22}$$

where S is the SIGA signal transmitted by the AP 104, H is the channel matrix between the AP 104 and the UE 112$b$, and Z is the noise.

In an embodiment, a SIGA bit can be either +1 or −1. In a slicer based approach, the following equation is used to derive a factor $\hat{S}$:

$$\hat{S} = \text{sign}\left(\frac{Y}{\hat{H}}\right), \quad \text{Equation 23}$$

$$\text{sign}(x) = \begin{cases} 1 & \text{if } x \geq 1 \\ -1 & \text{if } x < 1 \end{cases},$$

$\hat{H}$ is the channel estimation where the factor $\hat{S}$ has a value comprising one of +1 or −1. The factor $\hat{S}$ is an estimation of the SIGA bit. Equation 23 provides a reliable estimation if, for example, the SNR is relatively moderate or high. For example, if the SNR is too low (i.e., if the noise Z is high), as equation 23 does not take into account the noise Z, the estimation of the SIGA bit using 23 may not be correct.

In a re-encoding approach, $\hat{S}$ can be derived by encoding and modulating the decoded the SIGA bit (e.g., after the SIGA bits are decoded and an error correction algorithm is applied to the decoded SIGA bits).

Subsequent to estimating the SIGA bit, the noise Z is estimated as follows:

$$\hat{Z} = Y - \hat{H}\hat{S} \quad \text{Equation 24}$$

where $\hat{Z}$ is an estimation of the noise Z. Subsequently, the baseband noise during the omni-portion of the packet is given by:

$$N_{BB\_omni} = \frac{1}{K}\sum_k |\hat{Z}_k|^2 \quad \text{Equation 25}$$

where $\hat{Z}_k$ represents the estimated noise for a $k^{th}$ tone from equation 24, and $N_{BB\_omni}$ represents the baseband noise during the omni-portion 304 of the packet and averaged over all possible tones.

In an embodiment, the AGC gain during the omni-portion 304 of the packet may be different from the AGC gain during the UE specific portion 308. Accordingly, to estimate the noise during the UE specific portion 308, the noise $N_{BB\_omni}$ has to be scaled appropriately.

Let $\Delta_{RSSI}$ be a change (e.g., an increase) in the AGC gain between the omni-porion 304 of the packet and the UE specific portion 308. Also, as previously discussed, let the factor r represent the post-AGC noise. Then the baseband noise $N_{BB}$ is derived from $N_{BB\_omni}$ by:

$$N_{BB} = N_{BB\_omni} \cdot \Delta_{RSSI}(1+r) \quad \text{Equation 26A}$$

$$\text{or } N_{BB} = N_{BB\_omni} \cdot (1+r) \quad \text{Equation 26B}$$

In equation 26B, the $\Delta_{RSSI}$ is assumed to be 1. In the case $\Delta_{RSSI}$ is not equal to 1, equation 26A is used to estimate the baseband noise $N_{BB}$; and in the case $\Delta_{RSSI}$ is equal to 1, equation 26B is used to estimate the baseband noise $N_{BB}$.

As previously discussed, the factor r can be tuned using a register based on measurements performed in an experimental setting and/or based on a LUT.

In an embodiment, if the UE 112$u$ has more than one receive antennas (e.g., antennas 116$u$1 and 116$u$2, as illustrated in FIG. 2), the baseband noise $N_{BB}$ can be computed on one of the receive antennas (e.g., and applied to data streams received by other receive antennas). In another embodiment, if the UE 112$u$ has more than one receive antennas (e.g., antennas 116$u$1 and 116$u$2, as illustrated in FIG. 2), the baseband noise $N_{BB}$ can be computed on all the receive antennas, and then averaged to find the baseband noise $N_{BB}$ for individual receive antenna.

In an embodiment, the estimated baseband noise $N_{BB}$ (e.g., as estimated using equation 26A or 26B) is used, for example, in one or more of the previously discussed linear multi-user equalizer (MEQ) algorithms (e.g., the MMSE algorithm, and the SUZF and SINR algorithm). For example, in these algorithms, the estimated baseband noise $N_{BB}$ is used (e.g., instead of the noise power $N_0$); along with using, instead of terms $A_u$ and $A_v$, a scaled version of the terms $A_u$ and $A_v$, to account for the AGC gain and scaling of the signal and interference signals by various components of the UE 112$u$.

Figure 4:
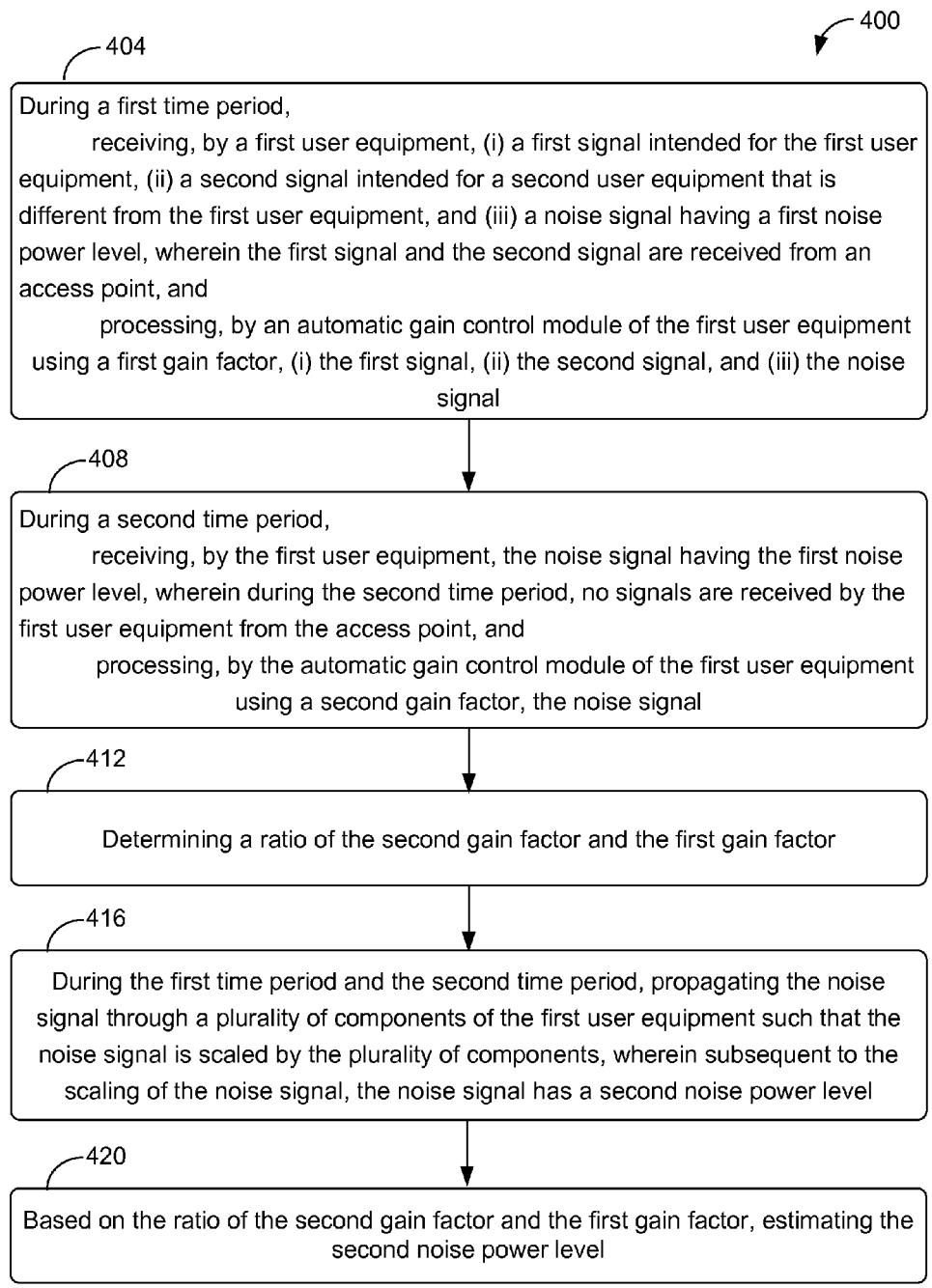
FIG. 4 illustrates an example method for operating the system of FIG. 1.

FIG. 4 illustrates an example method 400 for operating the system 100 (e.g., the UE 112$u$) of FIG. 1. At 404, during a first time period (e.g., while the UE 112 is receiving signals from the AP 104, i.e., subsequent to receiving the VHT-STF of the data packets), a first user equipment (e.g., the UE 112$u$) receives (i) a first signal intended for the first user equipment, (ii) a second signal intended for a second user equipment that is different from the first user equipment, and (iii) a noise signal having a first noise power level (e.g., noise power $N_0$), wherein the first signal and the second signal are received from an access point (e.g., AP 104). Also during the first time period, an automatic gain control module (e.g., the AGC module 208) of the first user equipment processes, using a first gain factor (e.g., gain factor RSSI), (i) the first signal, (ii) the second signal, and (iii) the noise signal.

At 408, during a second time period (e.g., the idle period, when no signal is transmitted by the AP 104), the first user equipment receives the noise signal having the first noise power level, wherein during the second time period, no signals are received by the first user equipment from the access point. Also during the second time period, the automatic gain control module processes, using a second gain factor (e.g., gain factor NF), the noise signal.

At 412, a ratio of the second gain factor and the first gain factor is determined (e.g., by the noise estimation module 228 using equation 18). At 416, during the first time period and the second time period, the noise signal is propagated through a plurality of components (e.g., the AGC module 208, the A/D converter module 212, the digital scaling module 216, and/or the FFT module 220) of the first user equipment such that the noise signal is scaled by the plurality of components, wherein subsequent to the scaling of the noise signal, the noise signal has a second noise power level (e.g., noise power $N_{BB}$). At 420, based on the ratio of the second gain factor and the first gain factor, the second noise power level is estimated (e.g., by the noise estimation module 228 using equations 20 and/or 21).

While the systems and methods herein will be described in the context of a MU-MIMO environment, the systems and method may be used in any communication system in which a signal detection technique accounts for the potential existence of a number of interfering communication channels.

In accordance with various embodiments, an article of manufacture may be provided that includes a storage medium having instructions stored thereon that, if executed, result in the operations described herein with respect to the method 400 (and/or various other operations discussed in the present disclosure). In an embodiment, the storage medium comprises some type of non-transitory memory (not shown). In accordance with various embodiments, the article of manufacture may be a computer-readable medium such as, for example, software or firmware.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

The description incorporates use of the phrases "in an embodiment," or "in various embodiments," which may each refer to one or more of the same or different embodiments. Furthermore, the terms "comprising," "including," "having," and the like, as used with respect to embodiments of the present disclosure, are synonymous.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Although specific embodiments have been illustrated and described herein, it is noted that a wide variety of alternate and/or equivalent implementations may be substituted for the specific embodiment shown and described without departing from the scope of the present disclosure. The present disclosure covers all methods, apparatus, and articles of manufacture fairly falling within the scope of the appended claims either literally or under the doctrine of equivalents. This application is intended to cover any adaptations or variations of the embodiment disclosed herein. Therefore, it is manifested and intended that the present disclosure be limited only by the claims and the equivalents thereof.

What is claimed is:

1. A method comprising:
during a first time period, receiving, by a first user equipment, (i) a first signal intended for the first user equipment, (ii) a second signal intended for a second user equipment that is different from the first user equipment, and (iii) a noise signal having a first noise power level, wherein the first signal and the second signal are received from an access point;
during the first time period, processing, by an automatic gain control module of the first user equipment using a first gain factor, (i) the first signal, (ii) the second signal, and (iii) the noise signal;
during a second time period, receiving, by the first user equipment, the noise signal having the first noise power level, wherein during the second time period, no signals are received by the first user equipment from the access point;
during the second time period, processing, by the automatic gain control module of the first user equipment using a second gain factor, the noise signal;
determining a ratio of the second gain factor and the first gain factor;
during the first time period and the second time period, propagating the noise signal through a plurality of components of the first user equipment such that the noise signal is scaled by the plurality of components, wherein subsequent to the scaling of the noise signal, the noise signal has a second noise power level; and
based on the ratio of the second gain factor and the first gain factor, estimating the second noise power level.

2. The method of claim 1, wherein:
during the first time period, processing, by the automatic gain control module of the first user equipment using the first gain factor, (i) the first signal, (ii) the second signal, and (iii) the noise signal further comprises
during the first time period, processing, by the automatic gain control module of the first user equipment using the first gain factor, (i) the first signal, (ii) the second signal, and (iii) the noise signal such that an output of the automatic gain control module has a first power level; and
during the second time period, processing, by the automatic gain control module of the first user equipment using the second gain factor, wherein processing the noise signal further comprises
during the second time period, processing, by the automatic gain control module of the first user equipment using the second gain factor, the noise signal such that (i) the output of the automatic gain control module has a second power level and (ii) the second power level is substantially equal to the first power level.

3. The method of claim 1, wherein the plurality of components comprises (i) the automatic gain control module, (ii) an analog to digital conversion module, and (iii) a digital scaling module.

4. The method of claim 1, wherein:
the noise signal is propagated through the plurality of components of the first user equipment, prior to transmitting the noise signal to a demodulator of the first user equipment;
a power of an input signal to the demodulator during the first time period is $\beta$;

the ratio of the second gain factor and the first gain factor is α; and estimating the second noise power level comprises
based on a ratio of β and α, estimating the second noise power level.

5. The method of claim 4, wherein the estimated second noise power level is equal to the ratio of β and α.

6. The method of claim 4, further comprising:
during the first time period, propagating the first signal and the second signal through the plurality of components of the first user equipment, wherein while propagating the first signal and the second signal through the plurality of components of the first user equipment, noise is added to the first signal and the second signal such that the noise added to the first signal and the second signal has a third noise power level at the input to the demodulator; and
based on the ratio of β and α, estimating the third noise power level.

7. The method of claim 6, wherein the estimated third noise power level is equal to a first factor multiplied by the ratio of β and α.

8. The method of claim 6, wherein the method further comprises:
tuning the first factor to achieve at least a threshold performance of the first user equipment.

9. The method of claim 6, wherein the method further comprises:
based on the first gain factor, tuning the first factor.

10. The method of claim 1, further comprising:
based on estimating the second noise power level, estimating the first signal.

11. A user equipment comprising:
(A) an antenna configured to
during a first time period, receive (i) a first signal intended for the user equipment, (ii) an interference signal, and (iii) a noise signal having a first noise power level, wherein the first signal and the second signal are received from an access point, and
during a second time period, receive the noise signal having the first noise power level, wherein during the second time period, no signals are received from the access point;
(B) an automatic gain control module configured to
during the first time period, process, using a first gain factor, (i) the first signal, (ii) the second signal, and (iii) the noise signal, and
during the second time period, process, using a second gain factor, the noise signal;
(C) a plurality of components that comprises at least the automatic gain control module and one or more other components, wherein during the first time period and the second time period, the noise signal is propagated through the plurality of components such that the noise signal is scaled by the plurality of components, wherein subsequent to the scaling of the noise signal, the noise signal has a second noise power level; and
(D) a noise estimation module configured to
determine a ratio of the second gain factor and the first gain factor, and
based on the ratio of the second gain factor and the first gain factor, estimate the second noise power level.

12. The user equipment of claim 11, wherein the automatic gain control module is further configured to:
during the first time period, process, using the first gain factor, (i) the first signal, (ii) the second signal, and (iii) the noise signal such that an output of the automatic gain control module has a first power level; and
during the second time period, process, using the second gain factor, the noise signal such that (i) the output of the automatic gain control module has a second power level and (ii) the second power level is substantially equal to the first power level.

13. The user equipment of claim 11, wherein the plurality of components comprises (i) the automatic gain control module, (ii) an analog to digital conversion module, and (iii) a digital scaling module.

14. The user equipment of claim 11, wherein:
the user equipment further comprises a demodulator;
the noise signal is propagated through the plurality of components, prior to transmitting the noise signal to the demodulator;
a power of an input signal to the demodulator during the first time period is β;
the ratio of the second gain factor and the first gain factor is α; and
the noise estimation module is configured to estimate the second noise power level such that the estimated second noise power level is based on a ratio of β and α.

15. The user equipment of claim 14, wherein the estimated second noise power level is equal to the ratio of β and α.

16. The user equipment of claim 14, wherein:
during the first time period, the first signal and the second signal are propagated through the plurality of components of the first user equipment, wherein while propagating the first signal and the second signal through the plurality of components of the first user equipment, noise is added to the first signal and the second signal such that the noise added to the first signal and the second signal has a third noise power level at the input to the demodulator; and
the noise estimation module is further configured to estimate the third noise power level, based on the ratio of β and α.

17. The user equipment of claim 16, wherein the estimated third noise power level is equal to a first factor multiplied by the ratio of β and α.

18. The user equipment of claim 16, wherein the noise estimation module is further configured to tune the first factor to achieve at least a threshold performance of the user equipment.

19. The user equipment of claim 16, wherein the noise estimation module is further configured to tune the first factor based on the first gain factor.

20. The user equipment of claim 11, further comprising:
a demodulator configured to, based on the estimated second noise power level, estimate the first signal.

* * * * *